Nov. 26, 1968
G. DYCK
3,413,019
CONDUIT CONNECTOR PARTICULARLY FOR UNDERGROUND
SPRINKLER SYSTEMS
Filed June 29, 1967
2 Sheets-Sheet 1
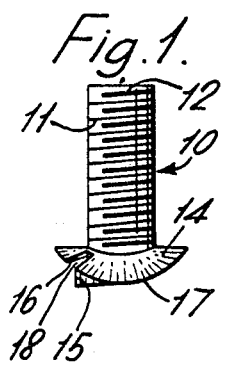
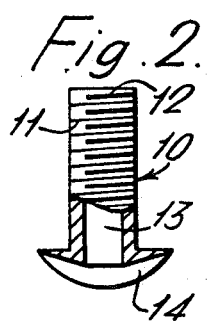
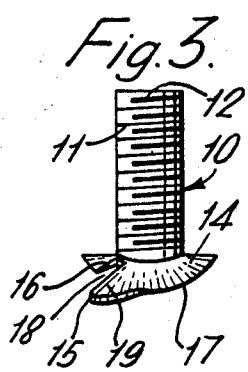
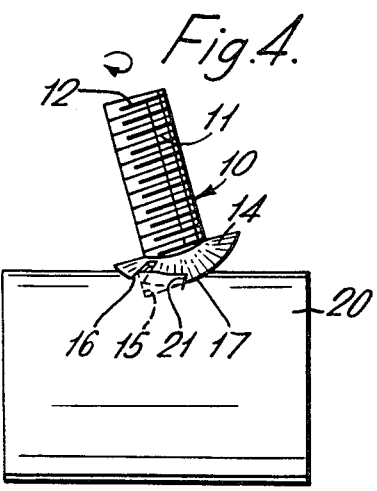
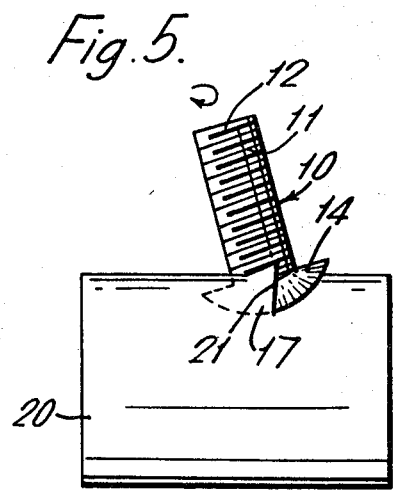
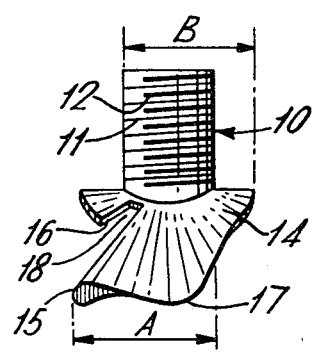
INVENTOR
GERHARD DYCK
BY
Dicke & Craig
ATTORNEYS Nov. 26, 1968 G. DYCK 3,413,019
CONDUIT CONNECTOR PARTICULARLY FOR UNDERGROUND
SPRINKLER SYSTEMS
Filed June 29, 1967 2 Sheets-Sheet 2

INVENTOR
GERHARD DYCK
BY
Dickie & Craig
ATTORNEYS

United States Patent Office 3,413,019
Patented Nov. 26, 1968

3,413,019
CONDUIT CONNECTOR PARTICULARLY FOR UNDERGROUND SPRINKLER SYSTEMS
Gerhard Dyck, 1306 13th St. E., Saskatoon, Saskatchewan, Canada
Filed June 29, 1967, Ser. No. 650,055
Claims priority, application Canada, Apr. 14, 1967, 987,897
12 Claims. (Cl. 285—209)

ABSTRACT OF THE DISCLOSURE

A connecting element is provided which includes a hollow stem, which is preferably threaded. Integral with the stem is an irregularly shaped circumferential enlarged annulus, for example a slotted circumferential annulus, or a slotted dished circumferential annulus, or a slotted dished circmferential annulus which includes a tongue extending from the leading edge of the slot, preferably in the form of a dished extension. Preferably, the circumferential edge near the slot is sharpened and the leading edge of the slot is thickened and the trailing edge of the slot is bevelled. The element is attached to a conduit by inserting a part of the enlargement into a hole in the conduit and then twisting the stem until the enlargement is within the conduit.

Also provided is the combination of the connecting element described above with a conduit.

This invention relates to methods and means for connecting pipes to conduits. More particularly, it relates to methods and means for connecting tubing to plastic supply lines. It has particular reference to methods and means for connecting tubing for sprinkler heads to underground plastic supply lines.

There are now two standard methods of providing means for connecting pipes and the sprinkler heads secured thereto to plastic supply lines. One procedure is the use of plastic T's that fit inside the plastic tubing. The second procedure involves the use of metal saddles which fit around the outer circumference of the plastic supply line.

It has been found that the T's which fit inside the plastic supply lines are not entirely satisfactory since they reduce the internal diameter of such lines and hence restrict the flow of water therein. This can result in a serious pressure drop in the supply line, particularly as the length of the supply line and the number of such T's required increases. Another serious falt with such plastic T's is that they may break if a heavy object, such a tractor-driven lawn mower, is driven over them. A further drawback is the cost both in terms of material and time of installation. Each conventional plastic T, in addition to its own capital cost, requires three further clamps to secure the horizontal supply line and the vertical pipe to it.

It has also been found that the use of saddles is not entirely satisfactory. Since the saddles are fitted on the outside of the supply lines, they must of necessity be bulky. While this is not a serious problem for small diameter tubing, in the case of larger diameter tubing, the mass of metal, and hence the cost of the saddle becomes a significant expenditure.

An object of one aspect of this invention is the provision of a connecting element for conduits which does not substantially restrict the flow of liquid therethrough.

An object of a further aspect of this invention is the provision of a connecting element for conduits which is relatively easy to install.

An object of another aspect of this invention is to provide novel supply conduit-tubing combinations.

By a broad aspect of this invention, a connecting element is provided for use with a resilient plastic conduit wherein the connecting element comprises a stem and an integral, annular head on said stem. The head has a radial slot extending radially inwardly from its circumferential edge towards, but terminating at a point spaced from the stem. By this construction a continuous, annular sealing shoulder is provided adjacent the stem together with a discontinuous annular lip adjacent the annular shoulder. The lip is bounded on one end by the leading edge of the radial slot, and on the other end by the trailing edge of the radial slot. An insertion guidance means is provided on the leading edge of the radial slot for guiding the annular head to a position partially within said conduit, and an aperture forming means is provided on the circumferential edge of the annular lip immediately adjacent the leading edge of the slot for guiding the annular head from a position partially within the conduit to a final aligned position fully within the conduit together with a bore extending through the stem and the annular head.

As a result of the above construction upon insertion of the leading edge of the radial slot into a preformed aperture in the conduit, the aperture being substantially the same diameter as the diameter of the stem, and on application of a torsional force to the stem in a first direction, the aperture forming means substantially simultaneously elastically distorts the preformed aperture and moves the annular head from a position partially within the conduit and partially outside the conduit to a final aligned position fully within the conduit with the annular sealing shoulder then being in substantially liquid-tight sealing engagement with the internal area of the conduit immediately surrounding the aperture.

By one embodiment of this invention, the insertion guidance means comprises a downwardly directed and blunt-faced edge. By another embodiment of this invention, the aperture forming means comprises a sharpened circumferential edge of the head. By still another embodiment of the invention, the trailing edge of the slot is higher than the leading edge of the slot. By yet another embodiment of the invention, the annular head is substantially saddle-shaped and according to still another embodiment of the invention, a tongue extends from the leading edge of the slot.

In this aspect, any of the embodiments and variants heretofore described, may be used to provide the novel combination made available by the invention.

In one aspect of the invention, the stem of the connecting element may be externally threaded, in which case the securing means may include internally threaded means threaded thereon. One preferred embodiment of such internally threaded means is a nut. In another embodiment, an adapter for connection with the piping may be interposed between the outer wall of the supply conduit and the nut.

In the accompanying drawings:

FIGURE 1 is a side view of a self-threading connecting element according to one aspect of the present invention;

FIGURE 2 is a partly sectioned view of the self-threading connecting element of FIGURE 1;

FIGURE 3 is a side view of a connecting element according to another embodiment of this invention;

FIGURE 4 is a side elevation showing the first step in carrying out the method of an aspect of this invention;

FIGURE 5 is a side elevation showing a further step in carrying out the method of an aspect of this invention;

FIGURE 8 is a side view of a connecting element according to yet another aspect of this invention.

Figure 6:
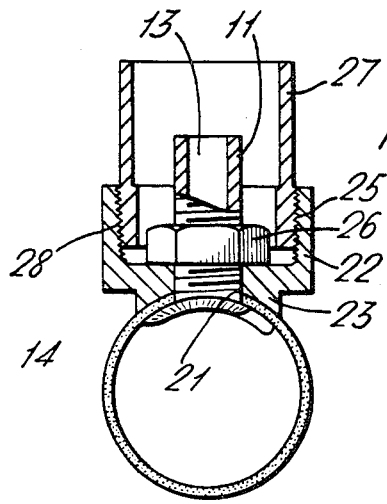
FIGURE 6 is a sectional view of the combination of yet another aspect of this invention.

Referring to FIGURES 1 and 2, it is seen that the connecting element of one embodiment of the present invention, shown generally as 10, consists of a stem 11, which, in the preferred embodiment, is cylindrical and which also includes external threads 12. The stem 11 is provided with a centrally disposed bore 13, which extends, as well through the irregularly shaped annular head 14.

Irregularly shaped annular head 14 is provided with a slot 18 extending from the outer circumferential edge thereof a major portion of the width thereof. Thus, the radial slot 18 extends radially inwardly from the circumferential edge of the annular head 14 towards, but terminates at a point spaced from, the stem 11. This divides the annular head into two sections, i.e. a continuous annular sealing shoulder disposed adjacent the stem 11, and a discontinuous annular lip adjacent the annular shoulder and providing the circumferential edge of the annular head 14. One end of the annular lip is provided by the leading edge 15 of slot 18, while the other end of the annular lip is provided by the trailing edge 16 of the slot 18. Insertion guidance means are provided on the leading edge 15 of the slot 18, i.e. a thickened leading edge. The trailing edge 16 of slot 18 may be sharp but preferably is bevelled or slightly rounded. Aperture forming means are provided on the circumferential edge of the annular lip immediately adjacent the leading edge 15 of slot 18, i.e. a sharpened circumferential edge 17 is provided spaced from but adjacent to slot 18.

The embodiment shown in FIGURE 3 is similar to that shown in FIGURES 1 and 2, but the annular head 14 also includes an integral tongue 19 disposed adjacent the leading edge 15 of the slot 18. The integral tongue enables the connecting element to be used for heavier duty applications.

FIGURES 4 and 5 show how the embodiment of one aspect of the invention as shown in FIGURES 1 and 2 may be attached to a plastic conduit in accordance with another aspect of this invention. The thickened leading edge 15 of the dished enlargement 14 is inserted in an aperture 21 of a diameter substantially the same as the outer diameter of the stem 11 which is punched, drilled or cut into in the plastic conduit 20 so that it projects into the interior of the conduit and so that the sharpened edge 17 contacts an edge of the aperture 21. The trailing edge 16 of the slot 18 rests on the outside surface of the plastic conduit 10. Torsional force in the direction of the arrow is then applied to the stem 11 thereby causing the portions of the dished enlargement 14 to be urged into the interior of the conduit 20, in a form of self-threading action. In other words, the introduction guidance means 17 substantially simultaneously elastically distorts the preformed aperture 21 and moves the annular head 14 from a position partially within the conduit 20 and partially outside the conduit 20 (as shown in FIGURES 4 and 5) to a "home" position fully within the conduit and in which the annular sealing shoulder is in substantially liquid-tight sealing engagement with the internal area of the conduit 20 immediately surrounding the aperture 21. When the entire dished enlargement 14 is disposed within the interior of the conduit 20, the connecting element 10 is secured firmly to the conduit 20. One manner of such securing is shown in FIGURE 6.

The connecting element 10 is mounted in association with the conduit 20 with the dished enlargement 14 fully within the conduit 20 and the stem 11 projecting through the aperture 21 in the conduit 20. Since the annular head 14 is shaped to fit the interior of the conduit 20, there is very little blockage of the interior thereof. An adapter 22 is slipped over the upstanding stem. The lower portion 23 of the adapter 22 is provided with a surface to fit the circumference of the conduit 20. The adapter 22 includes an upper cylindrical portion 24 provided with internal threads 25. A nut 26 is then threaded over the stem 13 and by tightening the nut, the connecting element 10 and the adapter 22 are firmly attached to the conduit 20. A riser 27 is secured to the adapter 22 by means of external threads 28 thereon.

While one manner has been shown for securing the connecting element 10 to the conduit 20, other manners are equally possible. Thus, the stem 11 of the connecting element 10 need not be threaded, and secure engagement may be provided by means of a locking ring, adapted to co-operate with a circumferential slot (not shown) in the stem 11. Also, if an adapter is not used, and if the stem 11 is not threaded, a resisiliently deformable riser may be used and by jamming into the stem could provide securement by frictional engagement alone. Furthermore, if the adapter is not used, and if the stem is threaded, an internally threaded riser may be secured directly to the threads on the stem.

Figure 7:
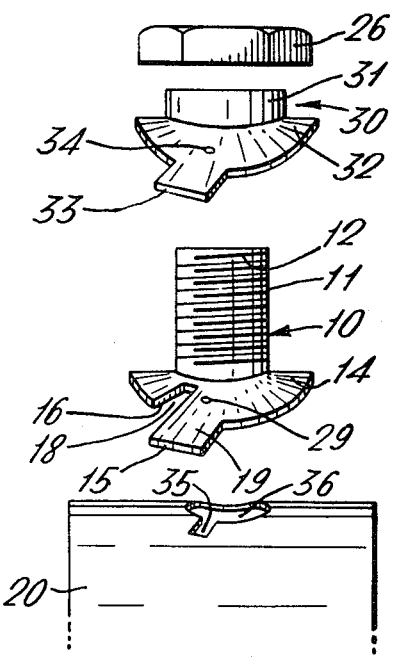
FIGURE 7 is an exploded side elevational view of a combination according to still another aspect of this invention.

Another embodiment is shown in FIGURE 7. The connecting element 10 includes a stem 11 having external threads thereon and a bore (not shown) as well as a slotted annular head 14. The leading edge 15 of the slot 18 is somewhat enlarged, but the trailing edge 16 is not sharpened. An integral tongue 19 is situated adjacent the leading edge 15. Disposed in the dished enlargement 14 near tongue 19 is a tapped hole 29.

A sealing adapter 30 is also an integral part of the combination. It includes a hollow stub 31 and, integral therewith, a dished enlargement 32. A tongue 33 is provided and is adapted to be in registry with tongue 19. An aperture 34, provided in dished enlargement 32, is adapted to be in registry with the tapped hole 29.

In use, the conduit 20 is provided with a hole 36 and a slot 35 along one edge thereof. The connecting element 10 is disposed within the hole 36 in a manner similar to that described with reference to FIGURES 4 and 5. After the connecting element 10 is so disposed with the dished enlargement 14 within the conduit 20, the sealing adapter 30 is then slipped over the stem 11 with the tongue 33 thereof in registry with the tongue 19. A screw (not shown) is passed through aperture 34 and is threaded into the tapped hole 29, the screw being disposed in slot 35. This secures the connecting element 10 to the conduit 20. An adapter such as 22 shown in FIGURE 6 may then be secured to connecting element 10 by means of nut 26. Alternatively, a riser 27 provided with internal threads may be attached directly to threaded stem 11.

Still another embodiment is shown in FIGURE 8. In this embodiment, the annular head 14 is provided with an integral dished extension 44. The dimensions of the components are such that the width A of the dished extension 44 is substantially the same as the diameter of the stem 11 taken with the width of dished enlargement 14, i.e. dimension B. One edge 17 of the dished extension is sharpened.

In use, the edge 15 of the connector is placed alongside the edge of a preformed hole in the conduit. The hole is cut or drilled to accommodate the exterior diameter of the threaded stem 11. The connector is then pushed so that portion 44 is directed into the interior of the conduit, the pushing being in such a manner that the sharpened edge 17 will cut the conduit anglewise. Torsional force is then applied in the manner previously described until the entire enlargement 14 and 44 is inside the conduit. This embodiment provides a larger surface inside the conduit, better to cover and seal the angular cut.

I claim:

1. A connecting element for use with a resilient plastic conduit comprising:
   (a) a stem;
   (b) an integral, annular head on said stem, said head having
      (i) a slot extending radially inwardly from the circumferential edge of said annular head towards, but terminating at a point spaced from, said stem, thereby to provide
  (ii) a continuous, annular sealing shoulder adjacent said stem, and
  (iii) a discontinuous annular lip adjacent said annular shoulder and bounded on one end by the leading edge of said radial slot, and on the other end by the trailing edge of said radial slot,
  (iv) insertion guidance means provided on the leading edge of said radial slot for guiding the annular head to a position partially within said conduit, and
  (v) aperture forming means on the circumferential edge of said annular lip immediately adjacent the leading edge of said slot for guiding the annular head from a position partially within said conduit to a final aligned position fully within said conduit; and
(c) a bore extending through said stem and said annular head;
whereby, on insertion of the leading edge of the radial slot into a preformed aperture in the conduit, said aperture being substantially the same diameter as the diameter of the stem, and on application of a torsional force to said stem in a first direction, said aperture forming means substantially simultaneously elastically distorts the preformed aperture and moves the annular head from a position partially within said conduit and partially outside said conduit to a final aligned position fully within said conduit, said annular sealing shoulder (ii) then being in substantially liquid-tight sealing engagement with the internal area of said conduit immediately surrounding said aperture.

2. The element of claim 1 wherein said insertion guidance means comprises a downwardly directed and blunt-faced edge.

3. The element of claim 1 wherein said aperture forming means comprises a sharpened circumferential edge of said head.

4. The element of claim 1 wherein the trailing edge of said slot is higher than the leading edge of said slot.

5. The element of claim 1 wherein said insertion guidance means comprises a downwardly directed and blunt-faced edge, wherein said aperture forming means comprises a sharpened circumferential edge of said head, and further wherein the trailing edge of said slot is higher than the leading edge of said slot.

6. The element of claim 5 wherein said annular head is substantially saddle-shaped.

7. The element of claim 1 including a tongue extending from the leading edge of said slot.

8. In combination,
(i) a conduit;
(ii) a connecting element associated with said conduit, said element comprising:
  (a) a stem;
  (b) an integral, annular head on said stem, said head having
    (i) a slot extending radially inwardly from the circumferential edge of said annular head towards, but terminating at a point spaced from, said stem, thereby to provide
    (ii) a continuous, annular sealing shoulder adjacent said stem, and
    (iii) a discontinuous annular lip adjacent said annular shoulder and bounded on one end by the leading edge of said radial slot, and on the other end by the trailing edge of said radial slot,
    (iv) insertion guidance means provided on the leading edge of said radial slot for guiding the annular head to a position partially within said conduit, and
    (v) aperture forming means on the circumferential edge of said annular lip immediately adjacent the leading edge of said slot for guiding the annular head from a position partially within said conduit to a final aligned position fully within said conduit;
  (c) a bore extending through said stem and said annular head;
whereby, on insertion of the leading edge of the radial slot into a preformed aperture in the conduit, said aperture being substantially the same diameter as the diameter of the stem, and on application of a torsional force to said stem in a first direction, said aperture forming means substantially simultaneously elastically distorts the preformed aperture and moves the annular head from a position partially within said conduit and partially outside said conduit to a final aligned position fully within said conduit, said annular sealing shoulder (ii) then being in substantially liquid-tight sealing engagement with the internal area of said conduit immediately surrounding said aperture; and
(iii) means for securing said connecting element to said conduit.

9. The combination of claim 8 wherein said insertion guidance means comprises a downwardly directed and blunt-faced edge, wherein said aperture forming means comprises a sharpened circumferential edge of said head, and further wherein the trailing edge of said slot is higher than the leading edge of said slot.

10. The combination of claim 9 wherein the stem of said connecting element is externally threaded, and wherein said securing means included internally threaded means threaded thereon.

11. The combination of claim 9 wherein the stem of said connecting element is externally threaded, and wherein said securing means comprises a nut.

12. The combination of claim 9 including an adapter secured to said connecting means adapted to attach fluid conducting means to said conduit.

References Cited

UNITED STATES PATENTS

| | | | |
|---|---|---|---|
| 591,431 | 10/1897 | Smith | 285—158 |
| 766,083 | 7/1904 | Watts | 285—209 |
| 1,062,635 | 5/1913 | Clements | 285—209 |
| 1,398,083 | 11/1921 | Tibbetts | 285—209 |
| 1,401,584 | 12/1921 | Cizek | 285—209 |
| 1,754,066 | 4/1930 | Tefft | 285—158 |
| 2,667,368 | 1/1954 | Ferguson | 285—159 |

CARL W. TOMLIN, *Primary Examiner.*

W. L. SHEDD, *Assistant Examiner.*